United States Patent [19]

Griffin

[11] Patent Number: 5,460,383
[45] Date of Patent: Oct. 24, 1995

[54] HYDRODEGRADABLE MOULDING MATERIALS

[75] Inventor: Gerald J. L. Griffin, Nr. Duddington, England

[73] Assignee: Epron Industries Limited, Stamford, Great Britain

[21] Appl. No.: 170,276

[22] PCT Filed: Jun. 30, 1992

[86] PCT No.: PCT/GB92/01180

§ 371 Date: Dec. 30, 1993

§ 102(e) Date: Dec. 30, 1993

[87] PCT Pub. No.: WO93/01242

PCT Pub. Date: Jan. 21, 1993

[30] Foreign Application Priority Data

Jul. 2, 1991 [GB] United Kingdom .................... 9114242

[51] Int. Cl.⁶ .................... F41J 9/16; C08L 3/00; C08L 95/00; C02K 3/26
[52] U.S. Cl. .................... 273/362; 106/212; 106/216; 106/284; 106/284.04
[58] Field of Search .................... 106/212, 216, 106/284, 284.04; 273/362, 363; 524/13, 35, 47, 59, 66, 423

[56] References Cited

U.S. PATENT DOCUMENTS

| 74,343 | 2/1868 | Graves | 106/212 |
|---|---|---|---|
| 172,321 | 6/1875 | Hutchins | 106/212 |
| 334,782 | 1/1886 | Kimble | 273/362 |
| 429,491 | 6/1890 | Warren | 273/362 |
| 1,283,913 | 11/1918 | Rodenberger | 106/212 |
| 1,329,232 | 1/1920 | Erler | 106/212 |
| 2,211,244 | 8/1940 | Routledge | 273/362 |
| 3,376,040 | 4/1968 | Moehlman et al. | 106/284 |
| 3,840,232 | 10/1974 | Ludwig et al. | 273/362 |
| 4,016,117 | 4/1977 | Griffin | 524/47 |
| 4,218,350 | 8/1980 | Griffin | 524/47 |
| 4,405,731 | 9/1983 | Carter, Jr. | 524/47 |
| 4,420,576 | 12/1983 | Griffin | 524/47 |
| 4,623,150 | 11/1986 | Moehlman et al. | 273/362 |
| 4,921,250 | 5/1990 | Ayres | 273/58 R |
| 4,983,651 | 1/1991 | Griffin | 524/47 |

FOREIGN PATENT DOCUMENTS 0061644  6/1978  Japan .................... 524/47

Primary Examiner—Peter A. Szekely
Attorney, Agent, or Firm—Webb Ziesenheim Bruening Logsdon Orkin & Hanson

[57] ABSTRACT

An article intended to be degraded when exposed to the environment is made from a brittle resinous or synthetic resin material incorporating moisture swellable particles as a filler, whereby exposure of the article to water induces fragmentation. In particular, hydrodegradable "clay pigeons" for shot-gun shooting may be made from a mixture of pitch, powdered limestone or chalk and dry potato starch. Exposure of such a "clay pigeon" or fragments thereof, to water causes swelling of the starch particles and consequent fragmentation of material into, eventually, a fine sludge which is ultimately absorbed into the ground.

2 Claims, No Drawings

HYDRODEGRADABLE MOULDING MATERIALS

This invention relates to a hydro-degradable moulding materials, to articles made of such materials and to a method of making such articles.

A commercial and utilitarian demand exists for articles made from materials which, whilst physically adequate for their immediate purpose, should disintegrate on disposal so as not to remain in the environment as visually offensive litter or become a source of hazard to humans or animals.

The applicants have recognised that one example of an article which should ideally be capable of disintegration under environmental influence is the projected target used for shot gun shooting and generally known as a clay pigeon. These clay pigeons must be strong enough to withstand the considerable stresses of projection from the spring launching devices used for the purpose and must also be hard and somewhat brittle in order to achieve a spectacular break when a hit is scored. As a result the fragments that are distributed over a wide area around the shooting site are sharp edged and being durable, remain as offensive and hazardous litter.

It is among the objects of the present invention to provide a clay pigeon which (or the fragments of which resulting from a "hit"), will degrade as a result of their exposure to the outdoor ground contact environment. Other items which can benefit by being perfectly stable in dry storage but progressively disintegratable when scattered on the earth or buried are articles utilised in military training exercises such as dummy land mines.

The inventor has been discovered that compositions made from resinous materials that are intrinsically brittle can be made surprisingly sensitive to exposure to moisture by incorporating swellable particulate materials within the resin as fillers. The diffusion of moisture into the surface of moulded articles made from mixtures of intrinsically brittle resins with swellable particulates stresses the surface layer of resin beyond the point of mechanical failure and the surface resin becomes permeated by a network of fine cracks. These reticulated cracks permit the further penetration of moisture causing particle swelling at a deeper level within the moulded mass and thus create a progressive failure situation which results in the moulded articles progressively disintegrating into a fine sludge of particles. In the case where the filler particles are carbohydrate or proteinaceous material the presence of fungal or bacterial action associated with moisture greatly accelerates the disintegration because the organic particles are converted by the action of enzymes derived from the micro-organisms into sugary or aminoacid substances of low molecular weight which attract water osmotically and contribute substantially to the swelling action.

According to one aspect of the present invention, there is provided an article intended to remain stable under dry conditions but to undergo fragmentation under moist conditions, the article being made from a brittle resinous or synthetic resin material incorporating moisture-swellable particles as a filler.

In accordance with a preferred embodiment, there is provided a clay pigeon, as herein defined, formed by moulding a composition comprising molten pitch and a particulate filler comprising moisture-swellable particles.

The composition preferably also includes a mineral filler or fillers which, whilst not contributing to the fragmentation under moist conditions, may be necessary to adjust the density of the composition so as to achieve the optimum weight for the finished article to ensure that its performance as a projectile is satisfactory.

According to a further aspect of the invention, there is provided a hydro-degradable moulding material comprising a brittle resinous or synthetic resin material incorporating a moisture-swellable particulate filler.

According to a yet further aspect of the invention, there is provided a method of making an article intended to remain stable under dry conditions but to undergo fragmentation under moist conditions, comprising mixing, with a fluid resinous or synthetic resinous material capable of solidifying or setting to form a brittle solid, a particulate filler including moisture swellable particles.

The fragmentation induced by particle swelling is evident in brittle synthetic polymers typified by glassy polystyrene with molecular weight of the order of 10000 and upwards but the effect is most dramatic with that group of resinous materials typified by the asphalts and pitches. Other polymeric materials with molecular weights of the order of 1000 to 3000 such as shellac, coumarone indene resin, and oligomeric forms of the common glassy thermoplastics such as polystyrene will also disintegrate very rapidly under moist and biologically active conditions if they are compounded with an appropriate quantity of a moisture sensitive particulate filler before being moulded. Typical filler particles have average particle diameters of 1 to 100 microns as typified by such substances as the natural polysaccharides, starch and powdered cellulose. Other swellable filler candidate particulates are yeast cells, fungal spores, dried dead bacterial cells, nut shell powders, woodflour or other dried and pulverised vegetable substances. Inorganic particulates typified by dehydrated salts such as calcium sulphate whose stable form is a hydrated salt of lower particle density and, therefore, greater particle volume have the same effect as the organic particulates although in the latter case the moisture-induced fragmentation is not augmented by micro-biological action.

Embodiments of the invention are described below in the following examples.

EXAMPLE 1

100 parts by weight of coal tar pitch having a fusion temperature of about 110° C. was loaded into a Werner Pfleiderer type twin rotor jacketed mixing machine maintained at 145° C. When the pitch was fully fused 170 parts by weight of hard limestone powder with a mean particle diameter of 20 microns was added. As soon as the limestone powder was fully incorporated into the fused pitch 17.1 parts by weight of potato starch which had been dried to a water content of less than 2% was added and the mixing operation continued until the semi-fluid mixture was uniform in appearance. For a 1 kilo batch this mixing operation occupied about 10 minutes. Portions of the still fluid mixture were taken from the mixing machine and introduced into a steel single cavity moulding tool of such shape as to produce a typical saucer shaped clay pigeon which could be readily ejected from the steel moulding tool as soon as the material had cooled sufficiently for the material to become rigid. The tool was used at room temperature and given time to cool to almost room temperature between each moulding operation. The moulding operation could be completed needing only modest pressures (about 50 pounds force from a simple screw press for a tool cavity of about 3 inches diameter) to close the two part moulding tool after introduction of the semi-fluid filled pitch composition.

When mouldings made by the process and from the material described in the above example were exposed to immersion in water it was noted that after a few days the surface layer became powdery and washed away and in two to three weeks time the whole moulding had been reduced to a sludge formed of fine particles of chalk-filled pitch, the starch filler having disappeared as a result of the bacterial action that inevitably develops in these non-sterile test operations.

EXAMPLE 2

100 parts by weight of coal tar pitch having a fusion temperature of about 110° C. was loaded into a Werner Pfleiderer type twin rotor jacketed mixing machine maintained at 145° C. When the pitch was fully fused 160 parts by weight of hard limestone powder with a mean particle diameter of 20 microns was added. As soon as the limestone powder was fully incorporated into the fused pitch 22.5 parts by weight of potato starch which had been pregelled on a heated roll machine, scraped from the roll surface in the usual manner in a flake form with less than 4% water content, and finally ground to pass a 60 mesh sieve, was added and the mixing operation continued until the semi-fluid mixture was uniform in appearance. For a 1 kilo batch this mixing operation occupied about 10 minutes. Portions of the still fluid mixture were taken from the mixing machine and introduced into a steel single cavity moulding tool of such shape as to produce a typical saucer shaped clay pigeon which could be readily ejected from the steel moulding tool as soon as the material had cooled sufficiently for the material to become rigid. The tool was used at room temperature and given time to cool to almost room temperature between each moulding operation. The moulding operation could be completed needing only modest pressures (about 60 pounds force from a simple screw press for a tool cavity of about 4 inches diameter) to close the two part moulding tool after introduction of the semi-fluid filled pitch composition. The final mouldings were about ⅛ th of an inch in thickness and weighed approximately 3 ounces.

When mouldings made by the process and from the material described in this second example were exposed to immersion in water it was noted that after a few days the surface layer became soft and washed away as flaky particles. In two to three weeks time the whole moulding had been reduced to a sludge formed of fine flaky particles of chalk-filled pitch, the starch filler having disappeared. It was concluded that the flaky appearance of the separated fragments was attributable to the flat fragments of roll dried starch used in this example as compared to the almost spherical starch particles of non-gelled starch used in the first example above.

It will be appreciated that mineral fillers other than hard limestone powder may be used in the formulation, such as powdered chalk.

I claim:

1. A clay pigeon which is stable under dry conditions but undergoes fragmentation under moist conditions, formed by moulding a composition comprising molten pitch and a particulate filler comprising moisture-swellable particles wherein the filler includes powdered dry starch and at least one material selected from the group consisting of limestone powder and chalk powder.

2. A method of making a clay pigeon which is stable under dry conditions but undergoes fragmentation under moist conditions, comprising the steps of fusing pitch or asphalt, mixing with the fused pitch or asphalt a filler including moisture-swellable particles, wherein the filler includes powdered dry starch and at least one material selected from the group consisting of limestone powder and chalk powder, placing the resultant composition, whilst still in a flowable condition, in a mould, allowing the composition to set in the mould to form a clay pigeon, and subsequently ejecting the clay pigeon from the mould.

* * * * *